(12) United States Patent
Reial et al.

(10) Patent No.: US 8,229,044 B2
(45) Date of Patent: Jul. 24, 2012

(54) EFFICIENT COVARIANCE COMPUTATION BY TABLE LOOKUP

(75) Inventors: Andres Reial, Lund (SE); Girum Alebachew, Kista (SE); Elias Jonsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1271 days.

(21) Appl. No.: 11/762,982

(22) Filed: Jun. 14, 2007

(65) Prior Publication Data

US 2008/0310562 A1 Dec. 18, 2008

(51) Int. Cl.
*H03K 5/01* (2006.01)

(52) U.S. Cl. ........ 375/346; 375/147; 375/148; 375/150; 375/341; 375/347

(58) Field of Classification Search ............ 375/148, 375/346, 146, 147, 347, 341
See application file for complete search history.

(56) References Cited

U.S. PATENT DOCUMENTS

| | | | |
|---|---|---|---|
| 6,363,104 B1 | 3/2002 | Bottomley | |
| 6,714,585 B1 | 3/2004 | Wang et al. | |
| 7,539,240 B2 * | 5/2009 | Cairns et al. | 375/152 |
| 2003/0210735 A1 * | 11/2003 | Ahn et al. | 375/148 |
| 2004/0028013 A1 | 2/2004 | Fitton et al. | |
| 2006/0007990 A1 | 1/2006 | Cozzo et al. | |
| 2006/0188007 A1 * | 8/2006 | Daneshrad et al. | 375/148 |

FOREIGN PATENT DOCUMENTS

| | | |
|---|---|---|
| EP | 1 128 564 | 8/2001 |
| WO | 2005/096517 A1 | 10/2005 |

OTHER PUBLICATIONS

Douglas A. Cairns, Gregory E. Bottomley, and Y.-P. Eric Wang, "Low Complexity Parameter Estimation for the Generalized Rake Receiver," *2004 IEEE 11th Digital Signal Processing Workshop & IEEE Signal Processing Education Workshop*, pp. 191-195.

Loran A. Jatunov and Vijay K. Madisetti, "Closed-Form for Infinite Sum in Bandlimited CDMA," *IEEE Communications Letters*, vol. 8, No. 3, Mar. 2004, pp. 138-140.

Loran Jatunov and Vijay K. Madisetti, "Computationally-Efficient SNR Estimation for Bandlimited Wideband CDMA Systems," *IEEE Transactions on Wireless Communications*, vol. 5, No. 12, Dec. 2006, pp. 3480-3491.

(Continued)

*Primary Examiner* — Dhaval Patel
(74) *Attorney, Agent, or Firm* — Coats & Bennett, P.L.L.C.

(57) ABSTRACT

The impairment processor described herein uses a look-up table operation to reduce the computational complexity associated with determining an impairment correlation between first and second sample streams for an interference rejection receiver. One exemplary impairment processor iteratively computes multiple partial impairment correlations based on values selected from look-up table(s), and combines the partial impairment correlations to obtain a final impairment correlation between the first and second sample streams. During each iteration, the impairment processor computes a pair of delay offsets corresponding to the respective processing and path delays of the first and second sample streams, computes an index value as a function of a difference between the pair of delay offsets, selects a pre-computed value from the look-up table based on the index value, determines a pulse correlation estimate based on the selected pre-computed value, and determines the partial impairment correlation for that iteration based on the pulse correlation estimate.

33 Claims, 7 Drawing Sheets

OTHER PUBLICATIONS

Gideon Kutz and Amir Chass, "Low Complexity Implementation of a Downlink CDMA Generalized RAKE Receiver," Proceedings of the IEEE 56$^{th}$ Vehicular Technology Conference, 2002 (VTC 2002—Fall), vol. 3, pp. 1357-1361.

Co-pending U.S. Appl. No. 11/479,483, filed Jun. 30, 2006.

Bottomley, G. E., et al., "A Generalized Rake Receiver for Interference Suppression", IEEE Journal on Selected Areas in Communications, Vol. 18, No. 8, Aug. 2000, pp. 1536-1545.

* cited by examiner

US 8,229,044 B2

EFFICIENT COVARIANCE COMPUTATION BY TABLE LOOKUP

BACKGROUND

The present invention relates generally to wireless receivers, and more particularly to interference suppression receivers.

Interference present in wireless communication signals impacts transmission power requirements, system capacity, data rates, etc. For example, lower interference levels enable data transmissions at lower transmission powers and/or at higher data rates. Thus, interference suppression represents an important element in wireless communications.

Multi-path dispersion represents one source of interference in Code Division Multiple Access (CDMA) systems, such as Wideband CDMA and IS-2000. With dispersion, multiple echoes of the transmitted signal(s) arrive at the receiver with different relative delays. These echoes cause interference between successive symbols and result in a loss of orthogonality between symbols sent on different, orthogonal codes. However, receivers may take advantage of correlations between multi-path signals to reduce interference from the received signals.

Wireless receivers may include an interference rejection equalizer (IRE) that takes advantage of the existing correlations to reduce multi-path interference, e.g., orthogonal interference due to own-cell interference and non-orthogonal interference due to other-cell interference. Generalized RAKE (GRAKE) receivers and Chip Equalizers (CE) represent two types of IREs. For example, GRAKE receivers include a bank of RAKE fingers, where each RAKE finger generates a despread sample stream with a particular finger delay. An interference rejection combiner (IRC) generates an output signal with reduced interference by combining the despread sample streams while applying the appropriate combining weights w. The IRE typically determines the combining weights such that $Rw=g$, where g represents a vector of channel coefficients for the multiple channel paths, and R represents a matrix of impairment correlations between the despread sample streams.

The IRE may estimate instantaneous impairment correlations R using a non-parametric approach, where the equalizer processes known pilot symbols embedded in the received signals to extract the impairment components. Based on the extracted impairment components, the receiver directly estimates the impairment correlations R. This type of approach typically requires a large number of pilot symbols. When the current measurement interval does not include a sufficient number of pilot symbols, the estimated impairment correlations R may be undesirably noisy. To remove at least some of the noise, the receiver may filter the estimated impairment correlations R. However, at high processing speeds, the resulting filtered impairment correlations represent more of a time average of the impairment correlations, instead of the desired instantaneous impairment correlations.

The IRE may alternatively estimate current impairment correlations R using a parametric approach. The parametric approach analytically constructs the impairment correlation matrix based on the available channel information. Because most of the multi-path interference comes from a limited number of well-defined sources, the parametric approach provides accurate impairment correlation estimates at both high and low processing speeds. However, the processing resources available to wireless devices may be insufficient for conventional parametric approaches.

SUMMARY

A wireless receiver processes a received multi-path signal to determine a desired symbol estimate. The wireless receiver comprises an impairment processor, weight calculator, and interference rejection equalizer, e.g., a GRAKE or chip equalizer. The interference rejection equalizer separates the received signal into multiple sample streams, where each sample stream is associated with a different processing delay corresponding to one of the received signal paths. The impairment processor determines impairment correlations between the sample streams, while the weight calculator uses the impairment correlations to generate weighting factors. The interference rejection equalizer subsequently applies the weighting factors to the sample streams and combines the weighted sample streams to simultaneously generate the desired symbol estimate while reducing interference in the desired symbol estimate.

The impairment processor of the present invention uses one or more look-up tables to reduce the computational complexity associated with determining an impairment correlation between first and second sample streams. In one exemplary embodiment, the impairment processor iteratively computes multiple partial impairment correlations based on values selected from look-up table(s), and combines the partial impairment correlations to obtain a final impairment correlation between the first and second sample streams. For each correlation entry, the impairment processor computes an entry-specific pair of delay offsets corresponding to the respective processing and path delays of the first and second sample streams. The impairment processor computes an index value as a function of a difference between the pair of delay offsets, selects a pre-computed value from the look-up table based on the index value, and determines a pulse correlation estimate based on the selected pre-computed value. Subsequently, the impairment processor determines the partial impairment correlation for that entry based on the pulse correlation estimate.

DETAILED DESCRIPTION

Figure 1:
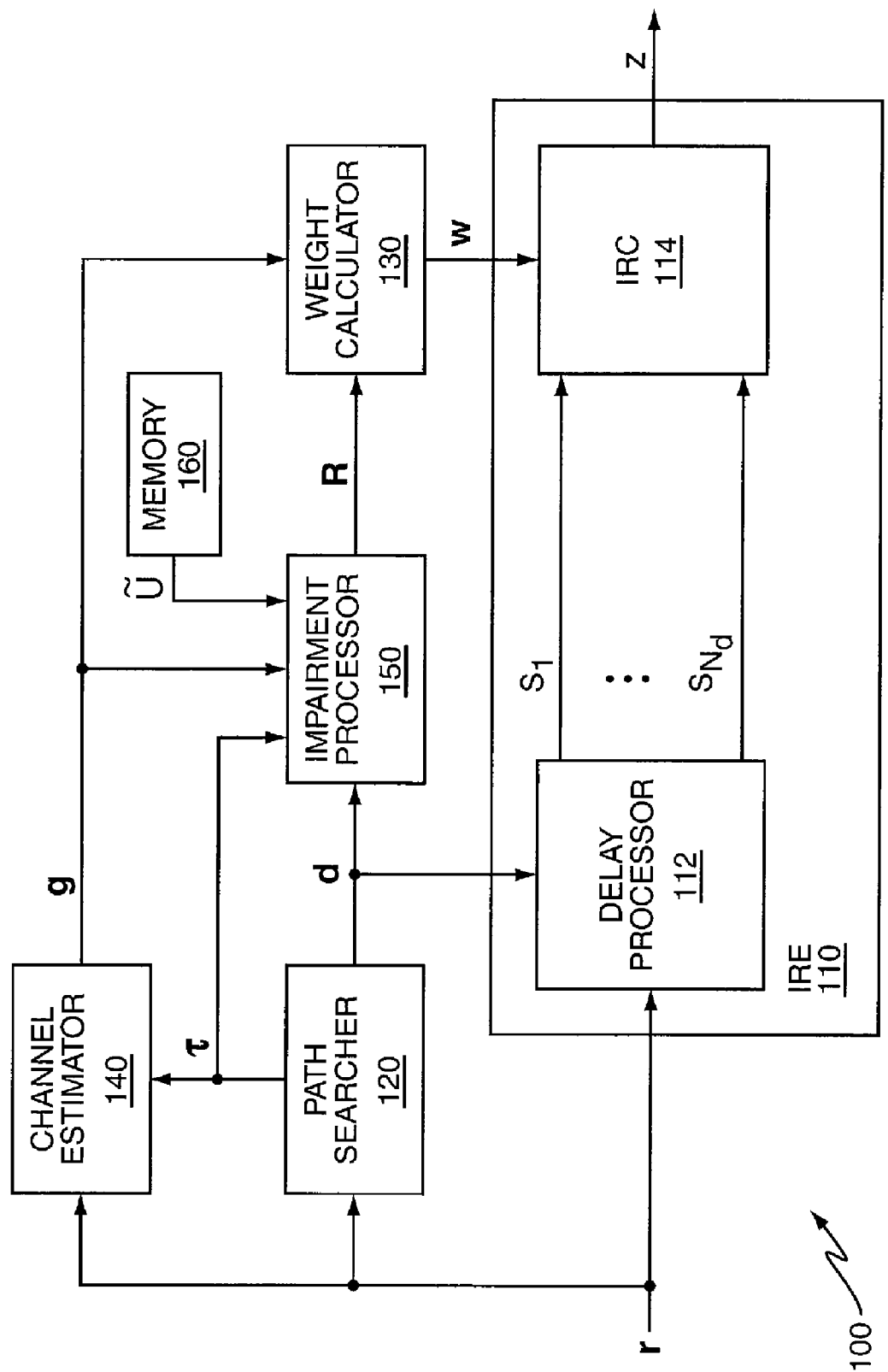
FIG. 1 shows a receiver according to one exemplary embodiment of the present invention.

FIG. 1 shows one exemplary interference rejection receiver 100 according to the present invention. Receiver 100 includes an interference rejection equalizer (IRE) 110, path searcher 120, weight calculator 130, channel estimator 140, impairment processor 150, and memory 160. IRE 110 generates output sample estimates z based on the received signal r, processing delays d generated by path searcher 120, and weighting factors w generated by the weight calculator 130. In one embodiment, IRE 110 comprises a delay processor 112 and interference rejection combiner (IRC) 114. Delay processor 112 generates a plurality of sample streams based on the received signal r and the processing delays d, and IRC 114 weights and combines the sample streams according to the weighting factors w. For example, when IRE 110 comprises a GRAKE receiver, the processing delays d comprise RAKE finger delays, and delay processor 112 comprises a bank of RAKE fingers that each generate a despread sample stream corresponding to each finger delay. IRC 114 weights and combines the despread sample streams to generate the desired output samples z. It will be appreciated that IRE 110 may comprise any interference rejection equalizer, including but not limited to, GRAKE receivers and chip equalizers.

Weight calculator 130 generates the weighting factors w based on channel coefficients g and impairment correlations R. The channel estimator 140 generates the channel coefficients g based on the received signal r and physical path delays $\tau$ generated by the path searcher 120. While the channel estimator 140 generates one channel coefficient g for each of the physical channel paths, it will be appreciated that the number of processing delays $N_d$ generated by path searcher 120 may differ from the number of physical channel paths $N_p$.

The impairment processor 150 generates the impairment correlations R between the sample streams output by delay processor 112 for one or more modeled impairment components. By combining the impairment correlation matrices according to:

$$R = \Sigma_n R_n, \qquad (1)$$

where $R_n$ represents the impairment correlation matrix for the $n^{th}$ impairment component, impairment processor 150 determines a composite impairment correlation matrix R.

Impairment processor 150 generates each element R(i,j) of an impairment correlation matrix $R_n$ according to:

$$R(i,j) = \sum_{l=1}^{N_p} \sum_{q=1}^{N_p} g_l g_q^* U_{lq}, \qquad (2)$$

where $$U_{lq} = \sum_{m \in S} P(d_i - \tau_l - mT_c) P^*(d_j - \tau_q - mT_c). \qquad (3)$$

In Equation (2), g represents the complex channel coefficient for a physical channel path, $N_p$ represents the number of physical channel paths, l and q represent indices for the physical channel paths, and $U_{lq}$ represents the pulse correlation estimate associated with the $l^{th}$ and $q^{th}$ physical path. In Equation (3), P(•) represents the end-to-end pulse shape including the transmit and receive filter responses, d represents the processing delay, $\tau$ represents the path delay, $T_c$ represents the length of the chip period, m represents a chip period sample index, and S represents the set of all m used to compute the impairment correlation R(i,j).

Figure 2:
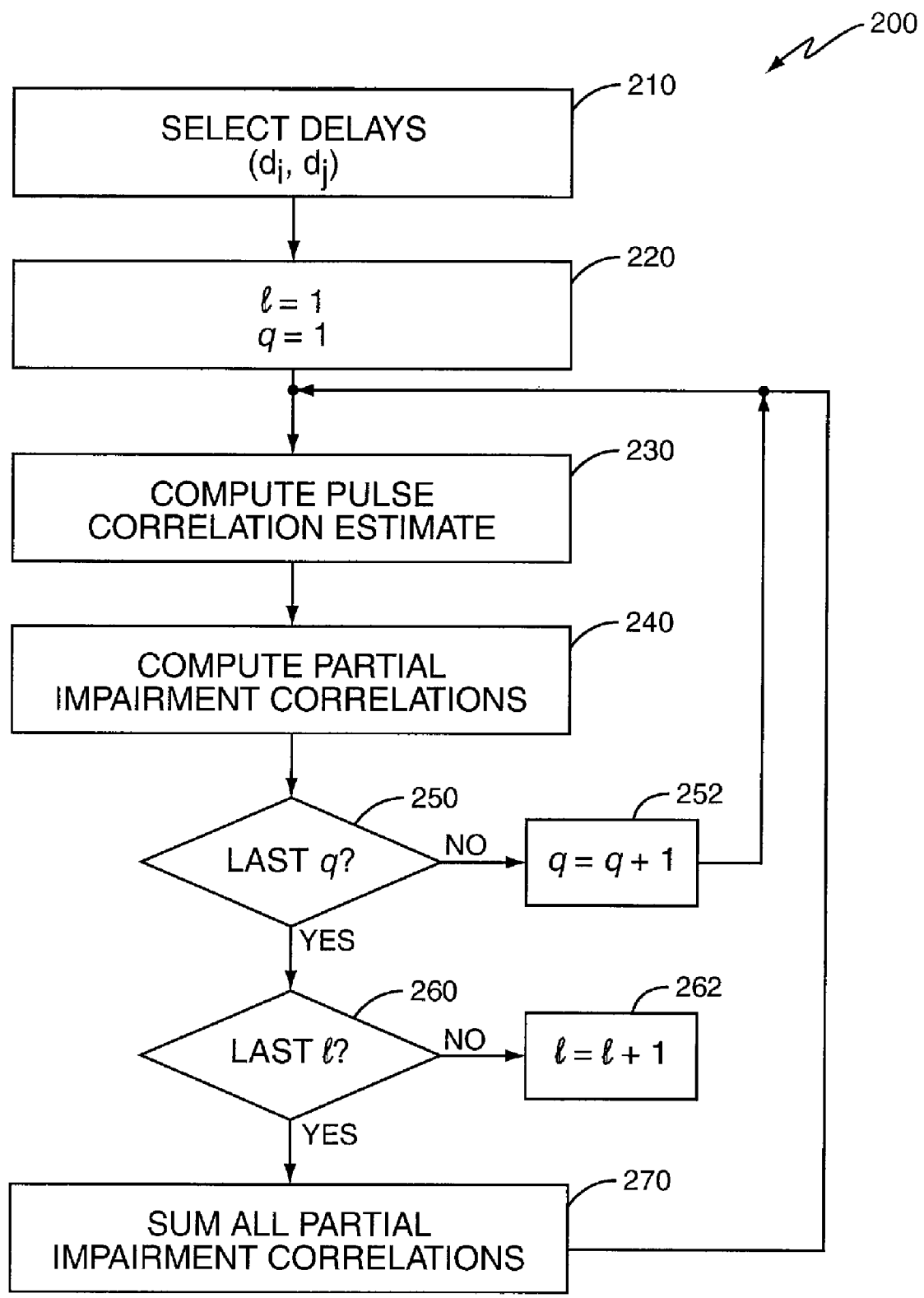
FIG. 2 shows a process for generating impairment correlations.

FIG. 2 shows one exemplary process 200 for generating R(i, j) according to Equation (2). After selecting processing delays $\{d_i, d_j\}$ (block 210), the impairment processor 150 initializes l and q (block 220) and computes the pulse correlation estimate $U_{lq}$ (block 230). The impairment processor 150 then computes a partial impairment correlation $R_{lq}(i,j)$ according to:

$$R_{lq}(i,j) = g_l g_q^* U_{lq} \qquad (4)$$

(block 240). The impairment processor 150 increments l and q (blocks 250, 252, 260, 262) and repeats blocks 230-240 for each value of l and q. To generate the final impairment correlation R (i, j) between sample streams associated with the selected processing delays $\{d_i, d_j\}$, the impairment processor 150 sums all partial impairment correlations $R_{lq}(i,j)$ (block 270). The impairment processor 150 repeats process 200 for each $\{i,j\}$ element of each impairment correlation matrix $R_n$.

When the impairment processor 150 computes an impairment correlation R(i, j) according to Equation (2), the number of processing operations may be prohibitively large. For example, assume $N_p=6$ paths, $N_d=10$ processing delays, and a range of $\pm M=6$ chip samples for each m. For this scenario, computing each $R_n$ requires $$\frac{1}{2} N_d^2 N_p^2 (2M) = 21{,}600$$

complex multiply and accumulate (MAC) operations. In advanced receivers that model more than one impairment component, several $R_n$ must be formed per time unit, e.g., per 0.67 ms WCDMA time slot. Such computations generally require significant processing resources.

The present invention significantly reduces the computational complexity associated with R(i,j) by replacing a portion of the calculations with a simple look-up table operation. For simplicity, the following describes the present invention in terms of computing one element R(i,j) for one impairment correlation matrix $R_n$. The present invention applies to the calculation of all of the impairment correlation elements R(i, j) for any impairment correlation matrix $R_n$.

Equation (3) may be rewritten as:

$$U_{lq} = \sum_{m \in S} P(\Delta_l - mT_c) P^*(\Delta_q - mT_c), \qquad (5)$$

where $\Delta_l = d_i - \tau_l$ and $\Delta_q = d_j - \tau_q$. Equation (5) shows that the pulse correlation estimate $U_{lq}$ associated with non-orthogonal interference components (where the set S includes the m=0 term) is not unique for all possible pairs of delay offsets $\{\Delta_l, \Delta_q\}$. Instead, the pulse correlation estimate $U_{lq}$ only depends on the difference between the delay offsets $\Delta_l - \Delta_q$. Thus, when memory 160 includes a look-up table 162 of pre-computed pulse correlation estimates associated with non-orthogonal interference components, the computations associated with each $U_{lq}$ may be replaced with a simple look-up operation indexed by $\Delta_l - \Delta_q$.

Figure 3:
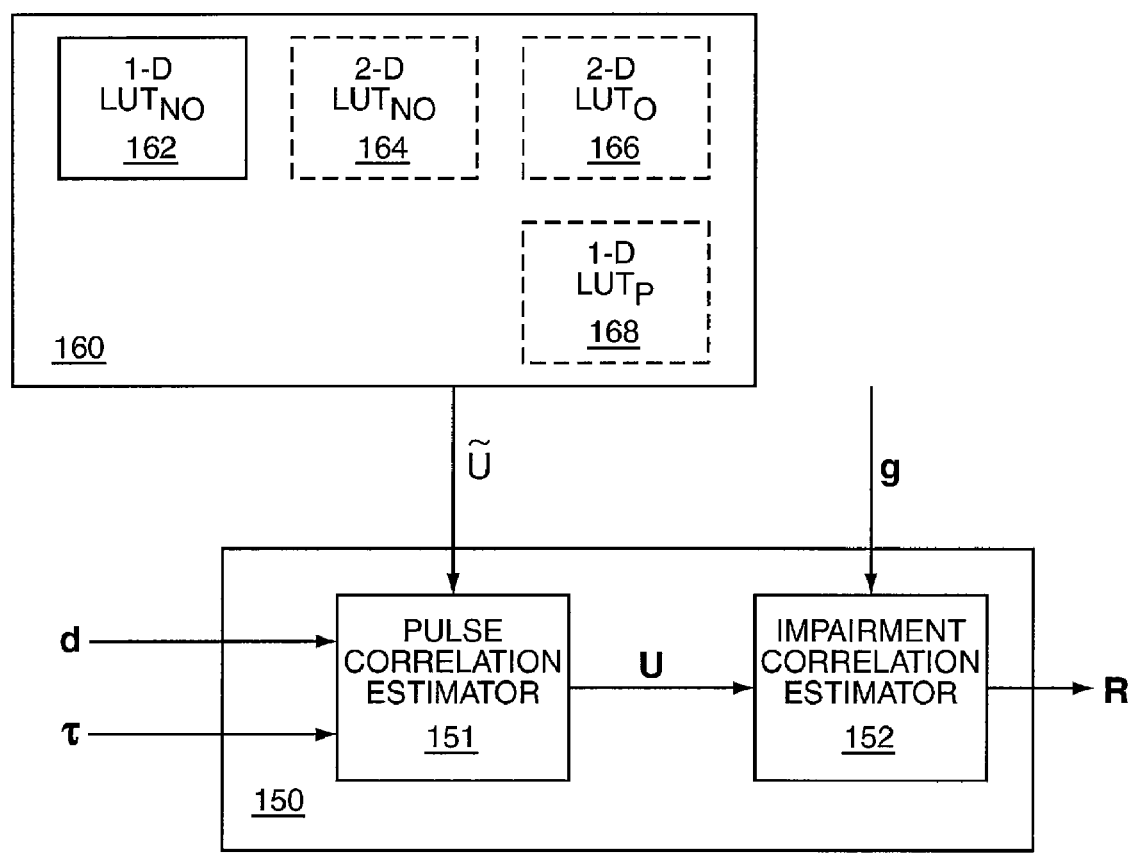
FIG. 3 shows one exemplary impairment processor for the receiver of FIG. 1.
Figure 4:
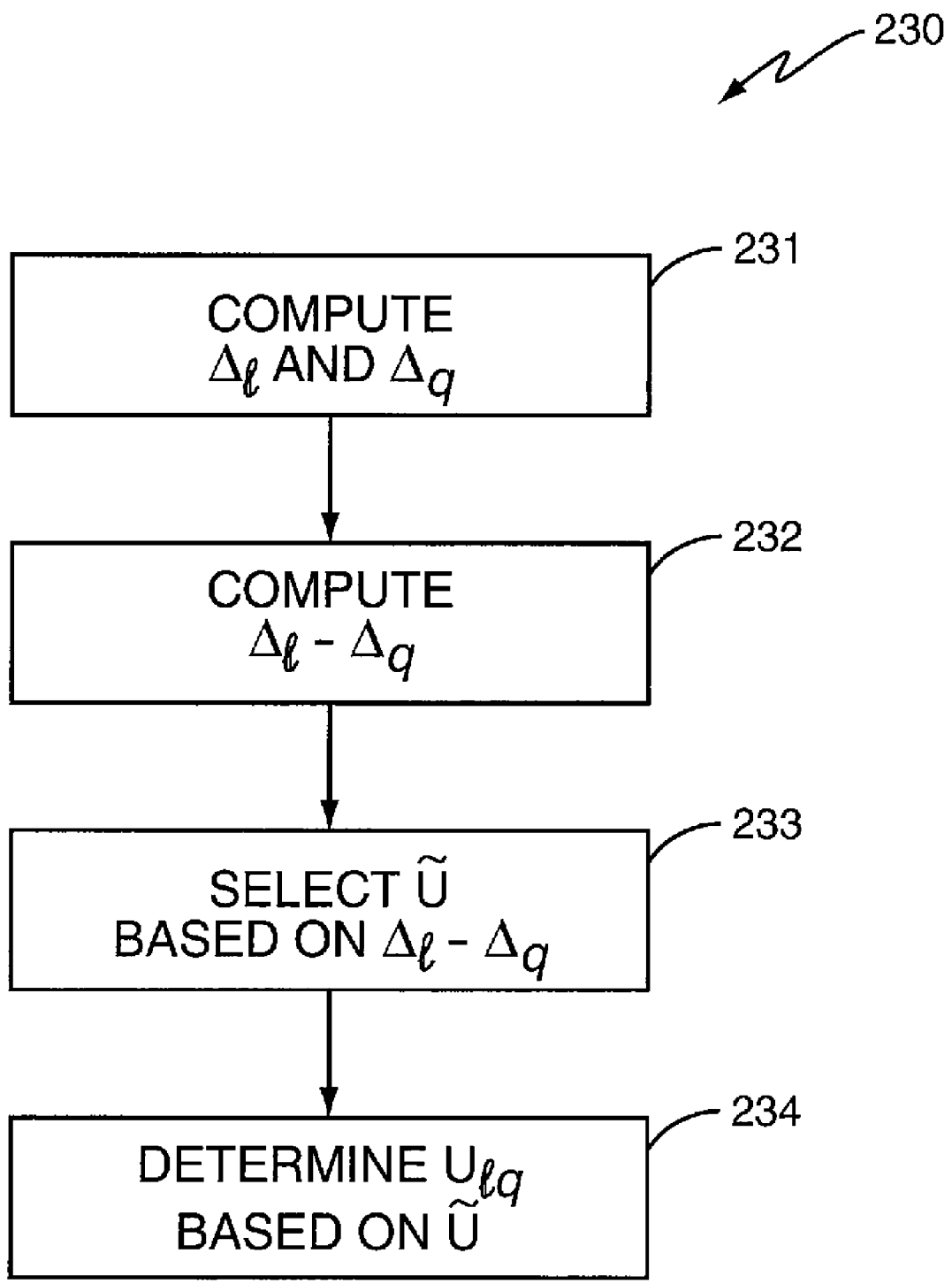
FIG. 4 shows one exemplary process for generating the pulse correlation estimates for the process of FIG. 2 using the impairment processor of FIG. 3.

FIG. 3 shows one exemplary impairment processor 150 for generating each impairment correlation R(i, j) of the impairment correlation matrix $R_n$. Impairment processor 150 determines R(i, j) based on $U_{lq}$, which are determined based on pre-computed values $\tilde{U}$ selected from the look-up table 162 for each of the l and q physical path combinations. The impairment processor 150 comprises a pulse correlation estimator 151 and an impairment correlation estimator 152. Pulse correlation estimator 151 determines $U_{lq}$ using process 230 as shown in FIG. 4. For each $\{l,q\}$ pair of physical paths, the pulse correlation estimator 151 computes the delay offsets $\Delta_l$ and $\Delta_q$ (block 231) according to:

$$\Delta_l = d_l - \tau_l$$

$$\Delta_q = d_j - \tau_q, \quad (6)$$

and computes an index value $\Delta_l - \Delta_q$ as a function of the difference between the computed delay offsets (block 232). As illustrated by Equation (6), the index values change for each $\{l,q\}$ pair. Pulse correlation estimator 151 selects a pre-computed value $\tilde{U}$ from the look-up table 162 for each index value (block 233), and determines each $U_{lq}$ for an $N_p \times N_p$ matrix U based on the selected pre-computed values $\tilde{U}$ (block 234). In one embodiment, the pulse correlation estimator 151 equates one or more of the pulse correlation estimates $U_{lq}$ to the corresponding pre-computed values $\tilde{U}$ selected from the look-up table 162. Impairment correlation estimator 152 determines R(i, j) based on U by computing a partial impairment correlation $R_{lq}(i, j)$ for each $U_{lq}$ according to Equation (4), and combining the partial impairment correlations, as shown by blocks 240 and 270 in FIG. 2.

As described above, the present invention replaces the computations associated with $U_{lq}$ with a look-up table operation. For the above example, computing one correlation matrix $R_n$ according to the present invention requires $$\frac{1}{2} N_d^2 N_p^2 = 1{,}800$$

MAC operations coupled with $$\frac{1}{2} N_d^2 N_p^2 = 1{,}800$$

look-up operations. A conventional system that relies solely on MAC operations would require $$\frac{1}{2} N_d^2 N_p^2 (2M) = 21{,}600$$

MAC operations to compute the same correlation matrix $R_n$. Thus, as long as the $U_{lq}$ values generated by pulse correlation estimator 151 have sufficient accuracy, the present invention provides significant processing savings without sacrificing performance.

The present invention may also be used with a receiver 100 that oversamples $P(\bullet)$. For this embodiment, receiver 100 samples $P(\bullet)$ at multiple samples per chip period. While the relationship between $U_{lq}$ and $\Delta_l - \Delta_q$ holds, the one-dimensional table 162 indexed by $\Delta_l - \Delta_q$ does not consider the position of the samples relative to the main lobe of $P(\bullet)$. To account for this, another embodiment of the present invention may store a two-dimensional look-up table 164 of pre-computed values associated with non-orthogonal impairment correlations in memory 160. The two-dimensional table 164 is indexed by the index value $\Delta_l - \Delta_q$ and a sampling phase $\rho_l$ associated with the $l^{th}$ physical path.

Figure 5:
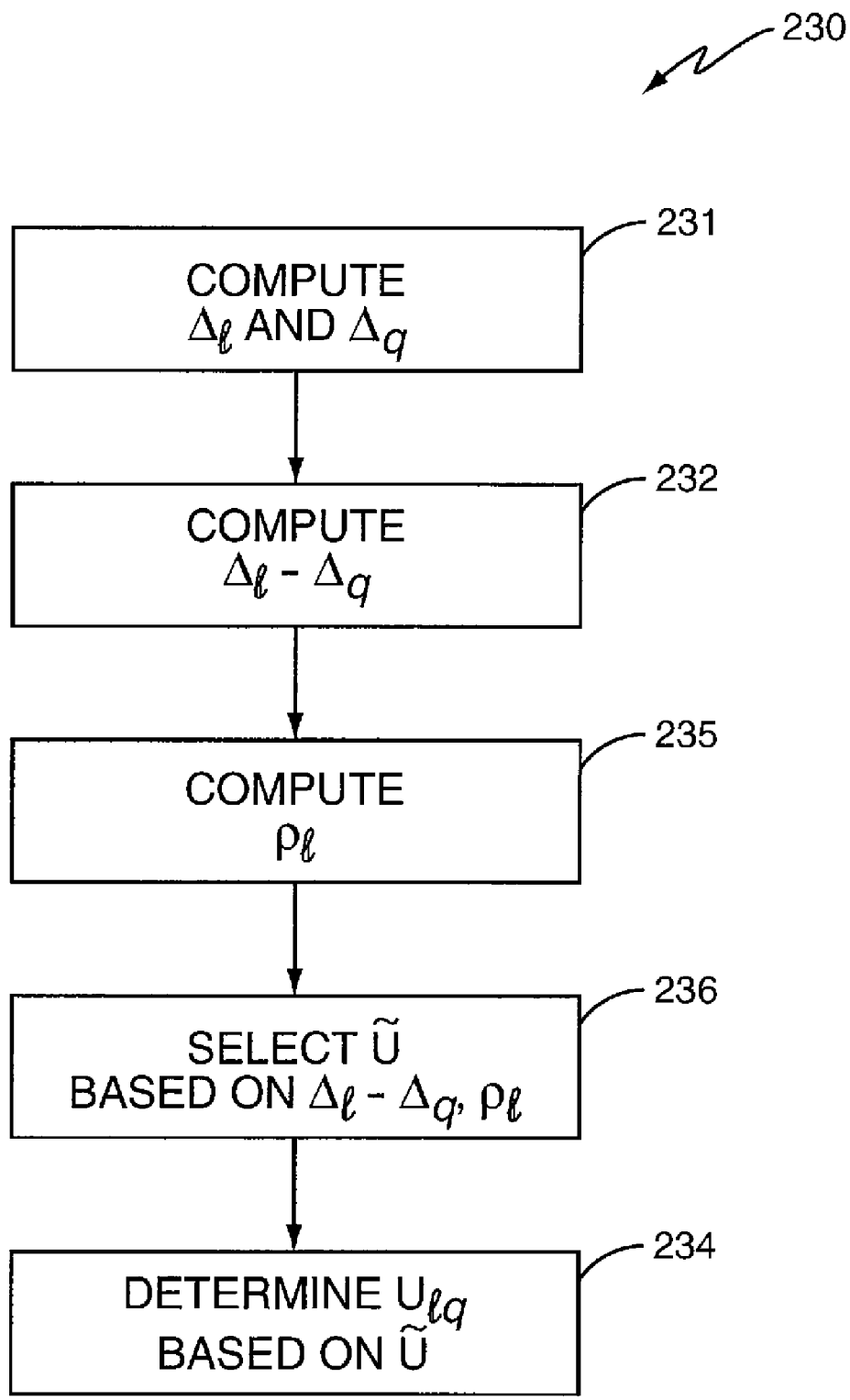
FIG. 5 shows another exemplary process for generating the pulse correlation estimates for the process of FIG. 2 using the impairment processor of FIG. 3.

FIG. 5 shows one exemplary pulse correlation estimation process 230 for an oversampling receiver 100. Pulse correlation estimator 151 computes the delay offsets $\Delta_l$ and $\Delta_q$ for each of the l and q physical paths (block 231), and computes the index value $\Delta_l - \Delta_q$ as a function of the difference between the computed delay offsets (block 232). The pulse correlation estimator 151 further computes the sampling phase $\rho_l$ (block 235) according to:

$$\rho_l = \Delta_l \bmod(T_c), \quad (7)$$

where mod($\bullet$) represents the modulo operation. Based on the sampling phase $\rho_l$ and index value $\Delta_l - \Delta_q$ for each $\{l,q\}$ pair, pulse correlation estimator 151 selects pre-computed values $\tilde{U}$ from the two-dimensional look-up table 164 (block 236). The pulse correlation estimator 151 determines each $U_{lq}$ for the l×q matrix U based on the selected pre-computed values (block 234). The impairment correlation estimator 152 determines R(i,j) as discussed above.

The sizes of look-up tables 162, 164 depend on the desired resolution and the desired sample set S for m. For example, two-dimensional look-up table 164 will accurately represent the calculation of Equation (3) for 4× oversampling (OS4) when table 164 covers differences between delay offsets $\Delta_l - \Delta_q$ for up to ±6 chip periods. Such a look-up table 164 for non-orthogonal impairment components would require 12 chips×4 differences×4 offsets=192 table entries. An exemplary one-dimensional look-up table 164 for non-orthogonal impairment components (assuming sampling offset is neglected) would require 12 chips×4 differences=48 entries.

When $P(\bullet)$ is symmetric, such as for a raised cosine (RC) or root raised cosine (RRC) pulse, the following equalities hold:

$$\tilde{U}(\Delta_l - \Delta_q) = \tilde{U}^*(\Delta_q - \Delta_l)$$

$$\tilde{U}(\rho_l, \Delta_l - \Delta_q) = \tilde{U}^*(\rho_q, \Delta_q - \Delta_l). \quad (8)$$

Figure 6:
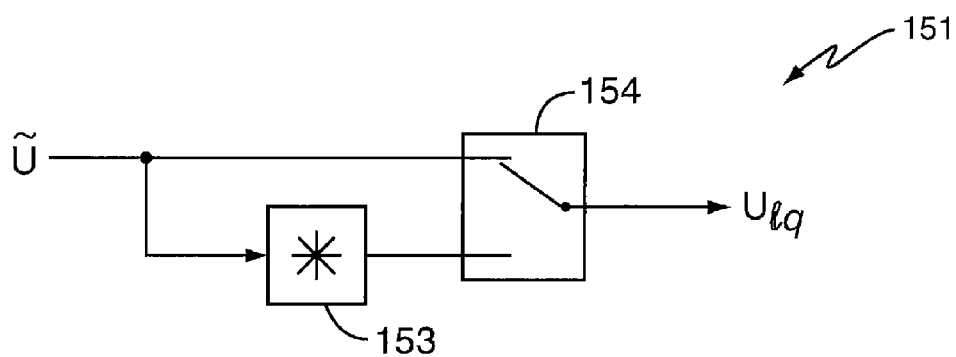
FIG. 6 shows one exemplary pulse correlation processor for the impairment processor of FIG. 3.

Equation (8) shows that the pre-computed values corresponding to negative delay offset differences may be derived from the pre-computed values corresponding to positive delay offset differences. Thus, it is sufficient to store the pre-computed values for only the positive delay offset differences. This generally reduces the size of the tables 162, 164 by half, e.g., 96 entries for the OS4 example above. For this scenario, pulse correlation estimator 151 may comprise a conjugate element 153 and a switch 154, as shown in FIG. 6. When $\Delta_l - \Delta_q$ is positive, switch 154 sets $U_{lq}$ equal to the pre-computed value selected from the look-up table 162, 164. When $\Delta_l - \Delta_q$ is negative, switch 154 sets $U_{lq}$ equal to the complex conjugate of the selected pre-computed value, as output by the conjugate element 153. It will be appreciated that further or alternative memory savings may be made by recognizing that some delay offsets yield equivalent results, e.g., the ¼ and ¾ sampling phases for OS4. By selectively eliminating any repeated values, the exemplary OS4 two-dimensional table 164 discussed above may be further reduced from 96 entries to 6×4 differences×3 offsets=72 entries.

Figure 7:
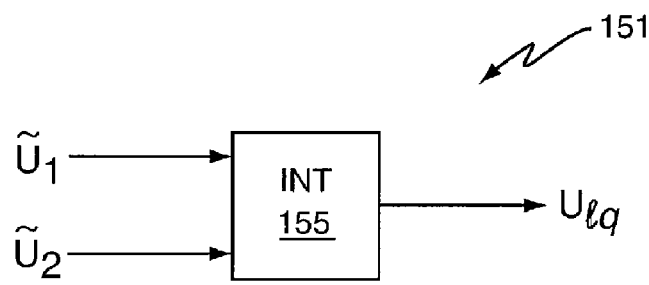
FIG. 7 shows another exemplary pulse correlation processor for the impairment processor of FIG. 3.

The pulse correlation function $U_{lq}$ of Equation (3) is an inherently smooth function. Thus, further table size reductions may be achieved when the pulse correlation estimator 151 interpolates between multiple pre-computed values selected from the look-up table 162, 164. FIG. 7 shows one exemplary pulse correlation estimator 151 comprising an interpolator 155. For this embodiment, the pulse correlation estimator 151 selects two or more pre-computed values from a look-up table 162, 164 based on $\Delta_l - \Delta_q$ (or $\Delta_l - \Delta_q$ and $\rho_l$). Interpolator 155 interpolates between the selected values to generate the desired pulse correlation estimate $U_{lq}$. While not explicitly shown, the interpolator 155 may be used with the conjugate element 153 and switch 154 of FIG. 6.

The above describes the present invention in terms of impairment correlations R(i,j) associated with non-orthogonal impairment components, such as impairments due to other-cell interference. The present invention may also be used to determine impairment correlations R(i,j) associated with impairment sources that are orthogonal to the desired signal if perfectly aligned, such as impairments due to own-cell interference. In such cases, the set S does not contain the m=0 term. The delay offsets $\Delta_l$, $\Delta_q$ associated with orthogonal impairment components generally have values close to 0. As the values of the delay offsets $\Delta_l$, $\Delta_q$ approach 0, the effect of the m=0 term on $U_{lq}$ changes relative to the above-described non-orthogonal case. Thus, the above-discussed non-orthogonal approach is not appropriate for orthogonal impairment components.

To address this, the present invention may generate $U_{lq}$ based on pre-computed values selected from a two-dimensional look-up table 166 associated with orthogonal impairment components. The pulse correlation estimator 151 indexes the orthogonal look-up table 166 using $\Delta_l$ and $\Delta_q$ to select each of the pre-computed values $\tilde{U}$. Pulse correlation estimator 151 then derives each element $U_{lq}$ of the pulse correlation matrix U based on the selected values. For the OS4 example, one exemplary look-up table 166 for orthogonal components requires $(6\times 4)^2/2=288$ entries.

Figure 8:
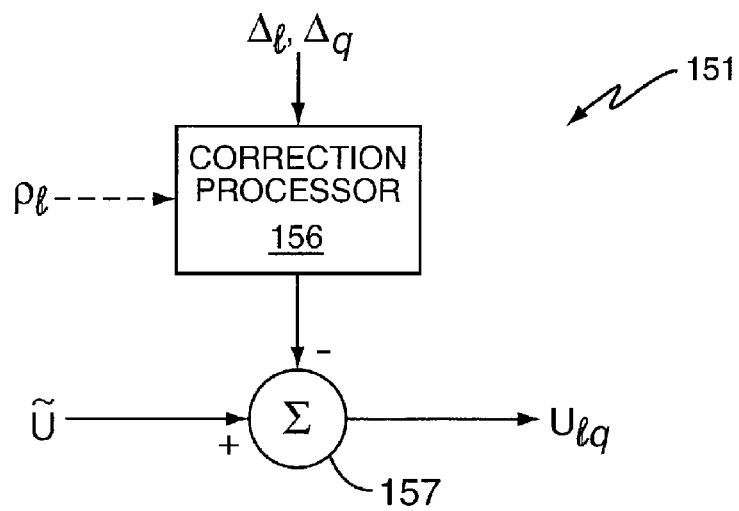
FIG. 8 shows another exemplary pulse correlation processor for the impairment processor of FIG. 3.

Alternatively, the present invention may eliminate the need for a separate orthogonal look-up table 166 by excluding the m=0 term when generating $U_{lq}$ from the non-orthogonal look-up table 162, 164. To that end, the pulse correlation estimator 151 may derive $U_{lq}$ for the orthogonal impairment components by applying a correction value $\xi_{lq}$ to a pre-computed value $\tilde{U}$ selected from the non-orthogonal look-up table 162, 164. FIG. 8 shows one exemplary pulse correlation estimator 151 comprising a correction processor 156 and combiner 157. The correction processor 156 determines the correction term $\xi_{lq}$ based on the delay offsets $\Delta_l$, $\Delta_q$. To exclude the m=0 term, the combiner 157 subtracts the correction term from the pre-computed value $\tilde{U}$ selected from the non-orthogonal look-up table 162, 164 according to:

$$U_{lq}=\tilde{U}-\xi_{lq}. \quad (9)$$

In one embodiment, the correction processor 156 may derive the correction term $\xi_{lq}$ based on one or more pre-computed values selected from a pulse look-up table 168 stored in memory 160. For example, the correction processor 156 may derive $\xi_{lq}$ according to:

$$\xi_{lq}=P(\Delta_l)P^*(\Delta_q), \quad (10)$$

where $P^*$ represents the complex conjugate of P. Alternatively, correction processor 133 may derive $\xi_{lq}$ from multiple pre-computed values $\tilde{U}$ selected from the non-orthogonal look-up table 162, 164 when $P(\cdot)$ corresponds to a symmetric pulse shape function, such as an RC or RRC pulse shape function. In this case, the correction processor 156 may derive $\xi_{lq}$ according to:

$$\xi_{lq}=\tilde{U}(\Delta_l)\tilde{U}^*(\Delta_q), \quad (11)$$

where $\tilde{U}^*$ represents the complex conjugate of $\tilde{U}$.

By using the correction term $\xi_{lq}$ pulse correlation estimator 151 reduces the memory requirements for determining impairment correlations R(i, j) for orthogonal impairment components. The correction term $\xi_{lq}$ from Equations (10) and (11) may be used with both oversampled and non-oversampled receivers 100. Further, one or more of the table reduction techniques described above with respect to FIGS. 6 and 7 may be used with the correction process of FIG. 8.

Figure 9:
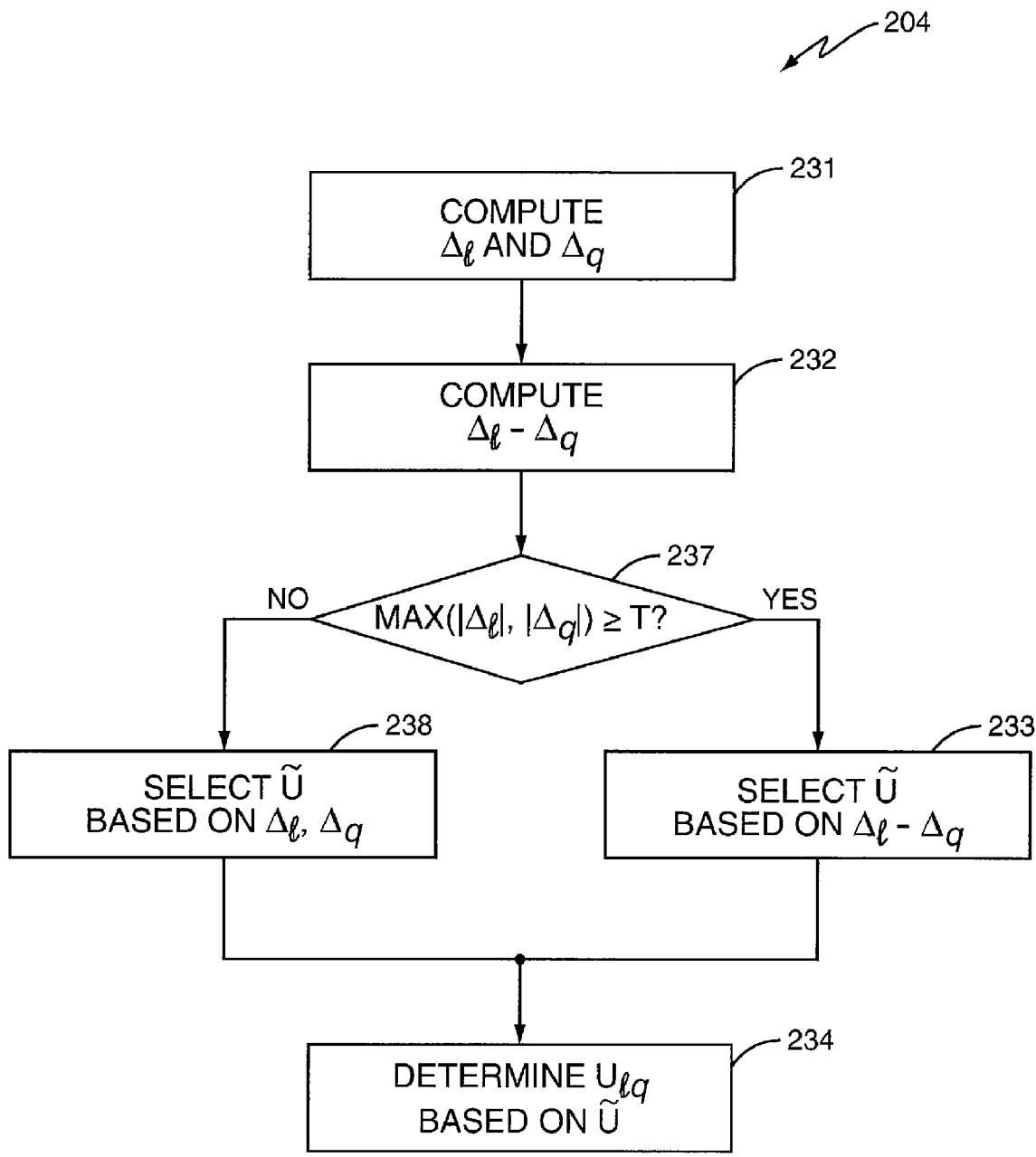
FIG. 9 shows one exemplary hybrid process for generating the pulse correlation estimates for the process of FIG. 2 using the impairment processor of FIG. 3.

The impact of the m=0 term decreases as $\Delta_l$, $\Delta_q$ increases, and may be considered insignificant beyond some distance, e.g., ±3-5 chip periods. Thus, to further reduce the processing requirements for U, the pulse correlation estimator 151 according to the present invention may implement a hybrid approach, whereby the orthogonal approach is applied to a subset of $\Delta_l$, $\Delta_q$ values, and the non-orthogonal approach is applied to the remaining $\Delta_l$, $\Delta_q$ values. FIG. 9 shows one exemplary hybrid process 204. Pulse correlation estimator 151 computes the delay offsets $\Delta_l$ and $\Delta_q$ for each of the l and q physical paths (block 231), and computes the index value $\Delta_l-\Delta_q$ as a function of the difference between the computed delay offsets (block 232). When the greater of $|\Delta_l|$ and $|\Delta_q|$ equals or exceeds a predetermined threshold T (block 237), the pulse correlation estimator 151 generates $U_{lq}$ using the above-described non-orthogonal approach (blocks 233, 234). For example, pulse correlation estimator 151 may determine $U_{lq}$ based on pre-computed values selected from look-up table 162 as indexed by $\Delta_l-\Delta_q$. When the greater of $|\Delta_l|$ and $|\Delta_q|$ is less than a predetermined threshold (block 237), the pulse correlation estimator 151 generates $U_{lq}$ using the above-described orthogonal approach (blocks 238, 234). For example, pulse correlation estimator 151 may generate $U_{lq}$ according to Equation (9). Impairment correlation estimator 152 then generates R(i,j) based on the pulse correlation estimates $U_{lq}$ for each $\{l,q\}$ pair.

The above-described impairment processor 150 may be used for any pulse form and any physical channel, e.g., a physical channel that may be modeled as a finite impulse response filter. Further, the determined impairment correlation matrix may be used to generate combining weights for any IRE 150. Exemplary IREs 150 include, but are not limited to, Generalized RAKE (GRAKE) receivers and chip equalizers (CE). For example, when the IRE 150 is a GRAKE receiver, R(i,j) represents the impairment correlation between despread sample streams output by the $i^{th}$ and $j^{th}$ RAKE fingers. When the IRE 150 is a CE structure, R(i,j) represents the impairment correlation between chip samples output by the $i^{th}$ and $j^{th}$ tap delay lines.

By using look-up tables to determine the pulse correlation values $U_{lq}$, the present invention significantly reduces the processing requirements associated with the impairment processor 150. Because the present invention either uses look-up tables with sufficient resolution or uses some amount of minimal processing to achieve the desired resolution from pre-computed values selected from a look-up table, the look-up table solution described herein does not suffer from the accuracy problems associated with past complexity reduction solutions.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for determining an impairment correlation between first and second sample streams associated with a received signal, the method comprising:
    storing pre-computed values in a look-up table;
    determining two or more partial impairment correlations based on respective pre-computed values selected from the look-up table; and
    combining the partial impairment correlations to generate a final impairment correlation between the first and second sample streams,
    wherein determining each of the two or more partial impairment correlations comprises:
        computing an index value as a function of a difference between first and second delay offsets corresponding to the respective first and second sample streams;
        selecting a pre-computed value from the look-up table based on the index value;
        generating a pulse correlation estimate based on the selected pre-computed value; and determining the partial impairment correlation based on the pulse correlation estimate.

2. The method of claim 1 wherein generating the pulse correlation estimate comprises setting the pulse correlation estimate equal to the selected pre-computed value.

3. The method of claim 1 wherein generating the pulse correlation estimate comprises generating the pulse correlation estimate based on a conjugate of the selected pre-computed value.

4. The method of claim 1 further comprising selecting one or more additional pre-computed values from the look-up table based on the index value, wherein generating the pulse correlation estimate comprises generating the pulse correlation estimate based on an interpolation between two or more of the selected pre-computed values.

5. The method of claim 1 wherein generating the pulse correlation estimate comprises:
determining a correction factor; and
applying the correction factor to the selected pre-computed value to account for orthogonal impairment components in the received signal.

6. The method of claim 5 wherein determining the correction factor comprises:
storing pulse shape values in a second look-up table;
selecting first and second pulse shape values from the second look-up table based on the first and second delay offsets, respectively; and
determining the correction factor based on the selected first and second pulse shape values.

7. The method of claim 5 wherein determining the correction factor comprises:
selecting a second pre-computed value from the look-up table based on the first delay offset;
selecting a third pre-computed value from the look-up table based on the second delay offset; and
determining the correction factor based on the second and third pre-computed values selected from the look-up table.

8. The method of claim 1 wherein selecting the pre-computed value comprises selecting the pre-computed value from the look-up table based on the index value and a sampling phase offset corresponding to a predetermined chip period.

9. The method of claim 8 further comprising computing the sampling phase offset based on one of the delay offsets.

10. The method of claim 1 wherein the pulse correlation estimate comprises a first pulse correlation estimate, the method further comprising:
applying a threshold condition to the first and second delay offsets;
determining the partial impairment correlation based on the first pulse correlation estimate responsive to a first threshold condition outcome; and
determining the partial impairment correlation based on a second pulse correlation estimate responsive to a second threshold condition outcome.

11. The method of claim 10 wherein the first pulse correlation estimate corresponds to a non-orthogonal impairment component and wherein the second pulse correlation estimate corresponds to an orthogonal impairment component.

12. The method of claim 10 further comprising:
storing pre-computed values in a second look-up table;
selecting a second pre-computed value from the second look-up table based on the first and second delay offsets; and
generating the second pulse correlation estimate based on the second pre-computed value selected from the second look-up table.

13. The method of claim 10 further comprising:
determining a correction factor to account for orthogonal impairment components in the received signal; and
applying the correction factor to the pre-computed value selected from the look-up table to generate the second pulse correlation estimate.

14. The method of claim 1 wherein computing the index value comprises:
computing the first delay offset as a function of a difference between a first processing delay corresponding to the first sample stream and a first path delay;
computing the second delay offset as a function of a difference between a second processing delay corresponding to the second sample stream and a second path delay; and
subtracting the first and second delay offsets to generate the index value.

15. The method of claim 14 wherein the first and second processing delays comprise finger delays corresponding to first and second RAKE fingers of a GRAKE receiver.

16. The method of claim 14 wherein the first and second processing delays comprise tap delays corresponding to first and second delay taps of a chip equalizer.

17. An impairment processor for determining an impairment correlation between first and second sample streams of a received signal using a look-up table of pre-computed values stored in memory, the impairment processor comprising:
a pulse correlation estimator configured to determine two or more partial impairment correlations based on respective pre-computed values selected from the look-up table, wherein the pulse correlation estimator determines each of the two or more partial impairment correlations by:
computing an index value as a function of a difference between first and second delay offsets corresponding to the respective first and second sample streams;
selecting a pre-computed value from the look-up table based on the index value; and
generating a pulse correlation estimate based on the selected pre-computed value; and
an impairment correlation estimator configured to combine the partial impairment correlations to generate a final impairment correlation between the first and second sample streams.

18. The impairment processor of claim 17 wherein the pulse correlation estimator sets the pulse correlation estimate equal to the selected pre-computed value.

19. The impairment processor of claim 17 wherein the pulse correlation estimator comprises a conjugation processor configured to generate the pulse correlation estimate based on a conjugate of the selected pre-computed value.

20. The impairment processor of claim 17 wherein the pulse correlation estimator is further configured to select one or more additional pre-computed values from the look-up table based on the index value.

21. The impairment processor of claim 20 wherein the pulse correlation estimator comprises an interpolator configured to interpolate between two or more of the selected pre-computed values to generate the pulse correlation estimate.

22. The impairment processor of claim 17 wherein the pulse correlation estimator comprises:
a correction processor to determine a correction factor; and
a combiner to apply the correction factor to the selected pre-computed value to account for orthogonal impairment components in the received signal.

23. The impairment processor of claim 22 wherein the memory includes a second look-up table of pulse-shape values, and wherein the correction processor determines the correction factor based on at least one pulse shape value selected from the second look-up table responsive to at least one of the first and second delay offsets.

24. The impairment processor of claim 22 wherein the correction processor determines the correction factor based on at least one additional pre-computed value selected from the look-up table responsive to at least one of the first and second delay offsets.

25. The impairment processor of claim 17 wherein the pulse correlation estimator selects the pre-computed value from the look-up table based on the index value and a sampling phase offset corresponding to a predetermined chip period.

26. The impairment processor of claim 25 further comprising a sample phase processor configured to compute the sampling phase offset based on one of the delay offsets.

27. The impairment processor of claim 17 wherein the pulse correlation estimate comprises a first pulse correlation estimate, and wherein the pulse correlation estimator is configured to:
   apply a threshold condition to the first and second delay offsets;
   determine each of the partial impairment correlations based on the first pulse correlation estimate responsive to a first threshold condition outcome; and
   determine each of the partial impairment correlations based on a second pulse correlation estimate responsive to a second threshold condition outcome.

28. The impairment processor of claim 27 wherein the first pulse correlation estimate corresponds to a non-orthogonal impairment component and wherein the second pulse correlation estimate corresponds to an orthogonal impairment component.

29. The impairment processor of claim 27 wherein the memory includes a second look-up table of pre-computed values, and wherein the pulse correlation estimator is further configured to:
   select a second pre-computed value from the second look-up table based on the first and second delay offsets; and
   generate the second pulse correlation estimate based on the second pre-computed value selected from the second look-up table.

30. The impairment processor of claim 27 wherein the pulse correlation estimator comprises a correction processor configured to:
   determine a correction factor to account for orthogonal impairment components in the received signal; and
   apply the correction factor to the pre-computed value selected from the look-up table to generate the second pulse correlation estimate.

31. An interference rejection receiver comprising:
an impairment rejection equalizer configured to:
   separate a received signal into two or more sample streams, where each sample stream is associated with a different processing delay;
   apply weighting factors to the sample streams; and
   combine the weighted sample streams to generate a desired sample with reduced interference;
memory configured to store a look-up table of pre-computed values; and
an impairment processor configured to determine impairment correlations between first and second sample streams, the impairment processor comprising:
   a pulse correlation estimator configured to determine two or more partial impairment correlations based on respective pre-computed values selected from the look-up table, wherein the pulse correlation estimator determines each of the two or more partial impairment correlations by:
      computing an index value as a function of a difference between first and second delay offsets corresponding to respective first and second sample streams;
      selecting a pre-computed value from the look-up table based on the index value; and
      generating a pulse correlation estimate based on the selected pre-computed value;
   an impairment correlation estimator configured to combine the partial impairment correlations to generate a final impairment correlation between the first and second sample streams; and
   a weight calculator configured to determine the weighting factors based on the impairment correlations.

32. The interference rejection receiver of claim 31 wherein the impairment rejection equalizer comprises a generalized RAKE receiver.

33. The interference rejection receiver of claim 31 wherein the impairment rejection equalizer comprises a chip equalizer.

* * * * *

UNITED STATES PATENT AND TRADEMARK OFFICE
CERTIFICATE OF CORRECTION

PATENT NO. : 8,229,044 B2  Page 1 of 1
APPLICATION NO. : 11/762982
DATED : July 24, 2012
INVENTOR(S) : Reial et al.

It is certified that error appears in the above-identified patent and that said Letters Patent is hereby corrected as shown below:

In Column 7, Line 50, delete "$\xi_{lq}$" and insert -- $\xi_{lq}$, --, therefor.

Signed and Sealed this
Twentieth Day of November, 2012

David J. Kappos
*Director of the United States Patent and Trademark Office*